(12) United States Patent
Hoeptner

(10) Patent No.: US 7,395,831 B2
(45) Date of Patent: Jul. 8, 2008

(54) FAUCET SEALING

(76) Inventor: Herbert W. Hoeptner, 7796 Oak Springs Cir., Gilroy, CA (US) 95020

(*) Notice: Subject to any disclaimer, the term of this patent is extended or adjusted under 35 U.S.C. 154(b) by 0 days.

(21) Appl. No.: 11/496,336

(22) Filed: Aug. 1, 2006

(65) Prior Publication Data

US 2007/0006921 A1   Jan. 11, 2007

(51) Int. Cl.
*F16K 43/00* (2006.01)

(52) U.S. Cl. ............................... 137/15.18; 137/315.12

(58) Field of Classification Search ............ 137/315.12, 137/15.08, 15.09, 15.17, 15.18, 315.13
See application file for complete search history.

(56) References Cited

U.S. PATENT DOCUMENTS

| | | | | |
|---|---|---|---|---|
| 7,048 | A | * | 1/1850 | Frink .......................... 425/202 |
| 1,156,010 | A | | 10/1915 | Kenney |
| 1,667,580 | A | * | 4/1928 | Albrecht ................. 137/315.12 |
| RE17,022 | E | | 7/1928 | Wilson |
| 2,417,494 | A | | 3/1947 | Hoof |
| 2,501,657 | A | | 3/1950 | Barkelew |
| 2,658,716 | A | | 11/1953 | Winfree |
| 3,892,383 | A | | 7/1975 | Hesse |
| 4,291,451 | A | * | 9/1981 | O'Neill et al. ................. 29/235 |
| 4,474,358 | A | | 10/1984 | Bennett |
| 5,007,614 | A | * | 4/1991 | Lockwood, Jr. ............... 251/83 |
| 5,083,589 | A | | 1/1992 | Wilcock |
| 5,103,857 | A | | 4/1992 | Kuhn et al. |
| 5,123,445 | A | | 6/1992 | Chung-Shan |
| 6,457,614 | B1 | | 10/2002 | Amidzich |

* cited by examiner

*Primary Examiner*—Kevin L Lee
(74) *Attorney, Agent, or Firm*—William W. Haefliger

(57) ABSTRACT

A faucet improvement including a seat defining a bore, and a valve stem movable toward and away from the seat, comprising a shoulder screw threadably attachable to the stem, and having a head located in the bore, a shank, and a non-metallic O-ring extending about the screw shank to be retained in the bore between the screw head and the valve stem, the O-ring sized to seal off between the shank and the bore.

2 Claims, 3 Drawing Sheets

FAUCET SEALING

BACKGROUND OF THE INVENTION

This invention relates generally to sealing of faucets, when closed, and more particularly to replacement of seals in faucets, to achieve superior sealing performance.

In the past, faucet seals were typically flat-sided, annular in shape, for pressing of a flat side against an annular metallic seat; or washer, when the seal was displaced axially as during faucet closing. Such annular, flat-sided seals depended upon substantial axial force exertion of a valve stem to develop seal deformation and sealing, and such force exertion increased the development of rubbing friction at interengaged rubber and metallic pressure transmitting surfaces, during relative rotation of such surfaces. Repeated faucet opening and closing often led to unwanted early wear and seal failure. A long felt need has existed for a solution to such conventional faucet seal wear and required replacement.

SUMMARY OF THE INVENTION

It is a major object of the invention to provide improved faucet sealing means, offering a solution to the above difficulties, and a means for improving the sealing of conventional faucets.

A further object includes provision of a valve stem metallic lateral and annular surface engaging the seat, radially outwardly of the top level of an O-ring seal. The valve stem typically defines a metallic skirt surrounding the metallic seat.

An added object includes provision of an elastomeric O-ring the radially outermost extent of which engages the flow bore, below the level of the metallic seat, which is engaged by the stem under-surface to define a metal-to-metal annular seal therewith. Two seals are thereby provided; a metal-to-metal annular seal and an elastomer-to-metal seal, within the bore. In this regard, an O-ring retention screw head typically defines a flat annular retention surface directly below the annular extent of the O-ring; and that flat annular surface has a periphery directly below about ⅔ of the bulk of the O-ring, whereby water pressurized deflection of the seal is upwardly and outwardly away from the screw head, and toward the metal-to-metal seal.

The invention also contemplates a method of repairing a faucet having a seat defining a bore, a valve stem, a flat annular seal to engage the seat above the bore, and a retention screw, the method including:
 i) removing the retention screw and removing the existing annular seal,
 ii) installing an elastomeric O-ring seal on the shank of screw, or a replacement screw, the O-ring seal provided to fit in faucet flow bore,
 iii) and threadably attaching the screw to the faucet stem so that the O-ring is received in said flow bore to seal off between the shank and the bore.

These and other objects and advantages of the invention, as well as the details of an illustrative embodiment, will be more fully understood from the following specification and drawings, in which:

DRAWING DESCRIPTION

FIG. 4 shows the O-ring assembled to a retention screw, as used in FIGS. 2 and 3, and providing a kit in a container, to be sold as in hardware stores as a replacement seal and retainer, for use in a homeowner's faucet needing seal replacement.

DETAILED DESCRIPTION

Figure 1:
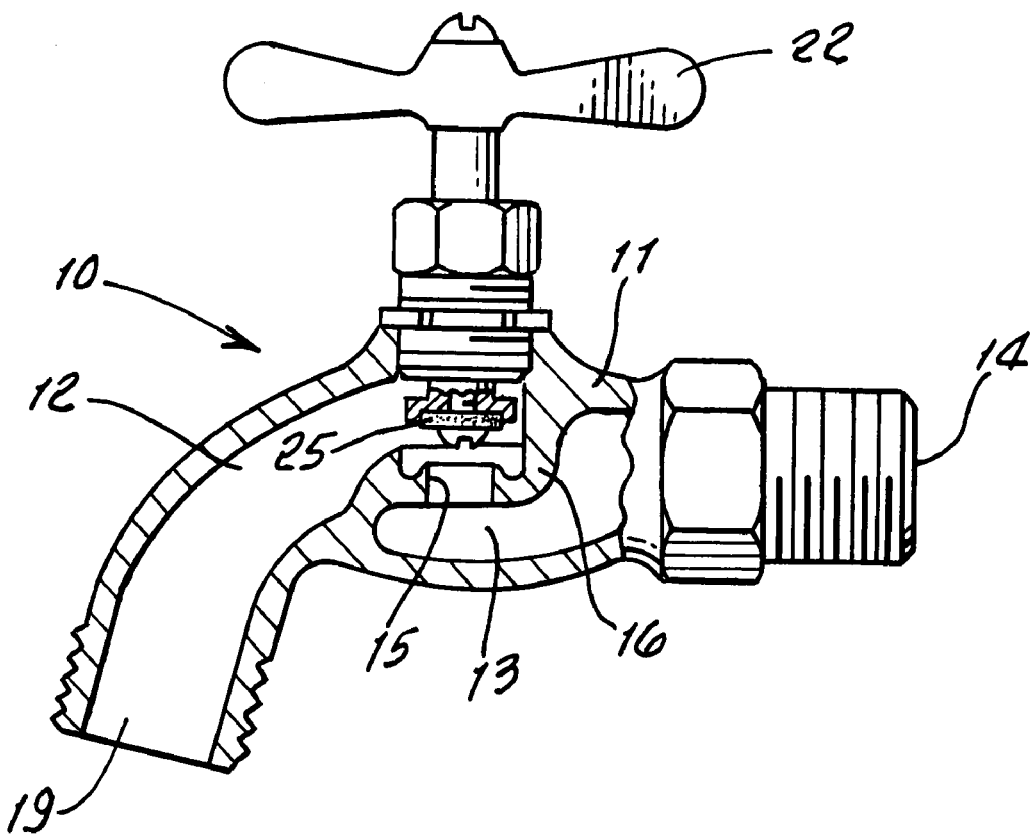
FIG. 1 is a section taken through an existing conventional faucet assembly.
Figure 1A:
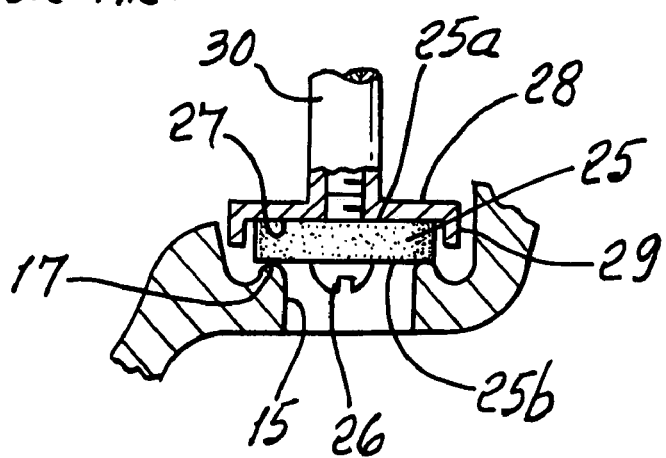
FIG. 1a is an enlarged fragmentary section showing the method of sealing in the FIG. 1 faucet.

Referring first to FIGS. 1 and 1a, an existing faucet 10 includes a body 11 defining upper and lower interior chambers 12 and 13. Inlet 14 delivers liquid such as water to chamber 13, for controlled flow through a bore 15 in interior wall 16. An upwardly projecting annular valve seat 17 is formed at the upper end of the bore. When the valve is opened, liquid flows through the bore and past the seat to upper chamber 12, and discharges at spout 19.

A valve stem 30 is movable upwardly to open the valve, and downwardly to close the valve. Handle 22 is rotatable to control upward and downward stem movement, and interengaged threads 23 and 24 carried on the stem and on the body offset stem movement, as the handle is rotated.

Referring to FIG. 1a, an annular rubber washer 25 is carried by the stem 30 to downwardly engage the seat 17, for sealing. A screw 26 holds the washer in position, within a cavity 27 in a stem flange 28. Skirt 29 bounds the washer periphery. The washer has flat, horizontal upper and lower sides 25a and 25b, and lower side 25b deteriorates due to rotary rubbing or frictional pressure contact with narrow width seat 17, which tends to "groove" the washer.

Figure 2:
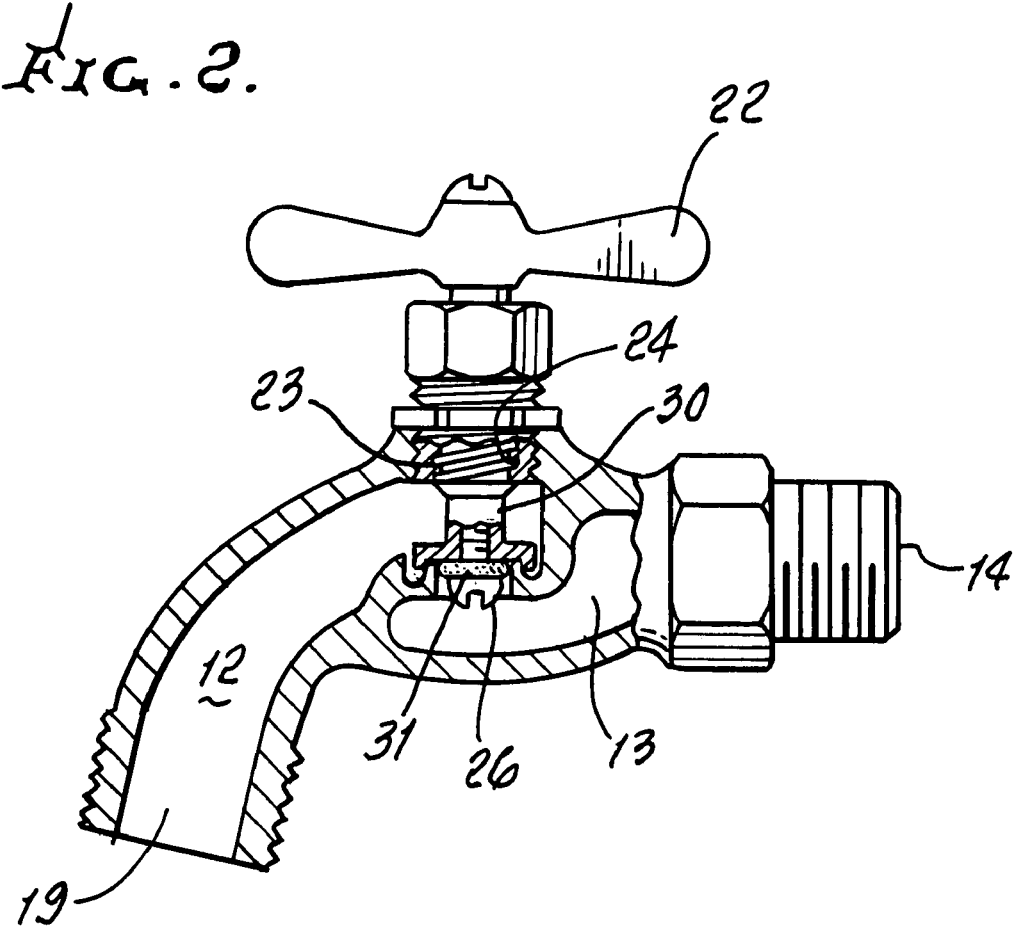
FIG. 2 is a section taken through a faucet embodying the invention, employing an O-ring seal.
Figure 2A:
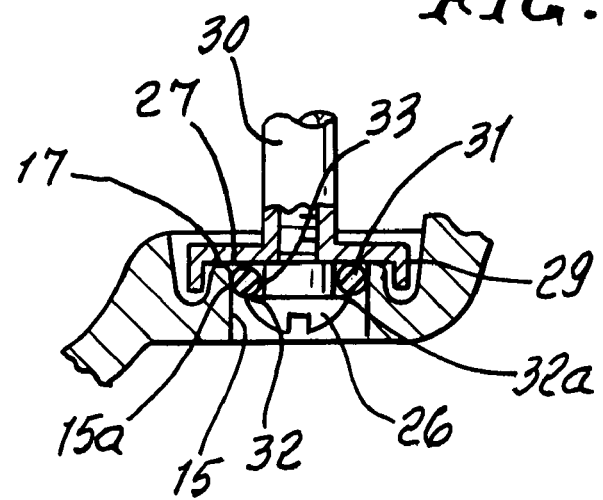
FIG. 2a is an enlarged fragmentary section showing the method of sealing in the FIG. 2 faucet.
Figure 3:
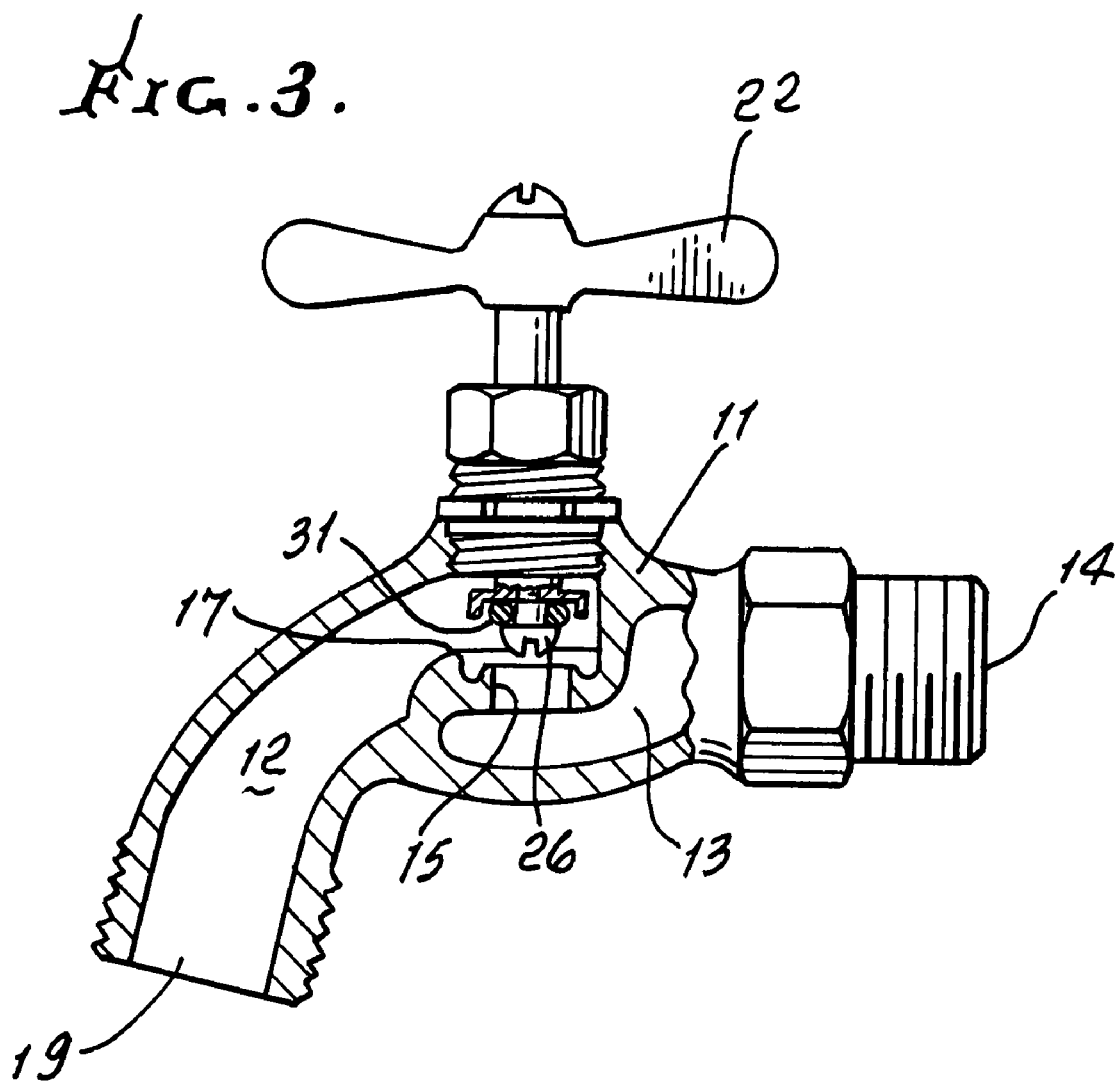
FIG. 3 shows the FIG. 2 faucet in open condition.

Referring now to FIGS. 2 and 2a, the washer 25 has been removed, and a new replacement seal installed. That seal is in the form of an annular O-ring 31 positioned so that it does not press downwardly on metallic seat 17, and avoids rubbing rotary frictional contact with that narrow width seat, thereby avoiding the groove formation problem. The valve stem and O-ring are typically characterized by one or more of the following:
 i) the O-ring fits in the bore 15, between lateral surfaces 27 and 32 defined by the valve stem and screw head; and between longitudinal annular surfaces 15a and 33 defined by the bore and the screw shank,
 ii) the top level of the O-ring is at or proximate a horizontal plane defined by the seat,
 iii) the valve stem defines a metallic lateral and annular surface 27 engaging the seat, radially outwardly of the top level of the O-ring,
 iv) the valve stem defines a metallic skirt 29 surrounding the seat, and spaced from O-ring 31,
 v) the O-ring typically consists of an elastomeric material,
 vi) radially outermost extent of the O-ring engages the bore at 15a spaced below the level of the seat 17.

Also, the engagement of the stem surface 27 and seat 17 defines a metal-to-metal annular seal or stop, spaced upwardly and radially outwardly of the annular seal defined by engagement of the O-ring with the bore. Further, the screw head 26 defines a flat annular surface 32 directly below the major extent of the O-ring. The screw head flat annular surface 32 has a periphery 32a directly below and medially of the outer ½ of the bulk of the O-ring. In FIG. 2a, the O-ring is not compressed, when the surface 27 engages seat 17.

In accordance with a further aspect of the invention, the method of repairing a faucet having a seat defining a bore, a valve stem, and an existing flat annular seal to annularly engage the seat above the bore, and a retention screw, with a replacement seal includes:

i) removing the retention screw and removing the existing defective annular seal,
ii) installing an O-ring seal on the shank of the screw, or a replacement screw, the O-ring seal provided to fit in the bore,
iii) and threadably attaching the screw to the stem so that the O-ring is received in the bore to seal off between the shank and said bore.

As referred to, the method of use includes advancing the stem toward the bore, to engage the metal stem with the metal seat, above the level of O-ring sealing with the bore, whereby a dual sealing action is achieved. Should the outer surface of the O-ring wear, in use, the O-ring will still seal due to liquid pressure exertion on the seal, tending to expand it against the bore.

FIG. 4 shows a kit 60 that includes a container 61, and replacement parts 26 and 31 within the container, for example to be sold to a homeowner, for faucet repair, including seal replacement. O-ring 31 may be bond attached to the screw shank 26a, or to screw head surface 32.

I claim:

1. The method of repairing a faucet having a seat defining a bore, a one-piece metallic valve stem, and a defective flat annular seal to manually engage the seat above the bore, and a retention screw, with replacement including:

i) removing the retention screw and removing the annular seal,
ii) installing an O-ring seal on the shank of said screw, or a replacement screw, the O-ring seal provided and sized to fit in said bore,
iii) and threadably attaching the screw to the stem so that the O-ring is received in said bore to directly seal off between the shank and said bore, and in alignment with a screw head defined by the screw, and so that the O-ring directly flatly engages a stem undersurface that faces the head, the O-ring consisting of elastomeric material,
iv) and wherein the O-ring is fitted in the bore, between and in engagement with a metallic lateral surface defined by the valve stem and a lateral surface defined by the screwhead, and between and in engagement with longitudinal annular surfaces defined by the bore and screw shank,
v) the top level of the O-ring located radially inwardly of a stem defined metallic skirt that surrounds said seat, the stem undersurface provided to have direct metal-to metal engagement with the seat for limiting stem movement toward the seat, said engagement located radially outwardly of the top level of the O-ring.

2. The method of claim 1 including advancing the stem toward said bore, to engage the seat, without compressing the O-ring.

* * * * *